United States Patent [19]

Mather

[11] 4,436,142

[45] Mar. 13, 1984

[54] METHOD AND APPARATUS FOR MAKING DUCTILE IRON CASTINGS

[75] Inventor: David S. Mather, Montreal, Canada

[73] Assignee: Harvey Hubbell Incorporated, Orange, Conn.

[21] Appl. No.: 319,217

[22] Filed: Nov. 9, 1981

[51] Int. Cl.³ .............................................. B22D 27/20
[52] U.S. Cl. ..................................... 164/337; 164/551; 164/561; 164/571
[58] Field of Search .................... 164/55.1, 56.1, 57.1, 164/136, 337

[56] References Cited

U.S. PATENT DOCUMENTS

| 521,449 | 6/1894 | Adams | 164/322 |
| 4,040,468 | 8/1977 | Nieman | 164/55.1 |

FOREIGN PATENT DOCUMENTS 2006704 8/1971 Fed. Rep. of Germany ..... 164/57.1

Primary Examiner—Gus T. Hampilos
Assistant Examiner—Richard K. Seidel
Attorney, Agent, or Firm—Jerry M. Presson

[57] ABSTRACT

A method and apparatus is disclosed for making ductile iron castings. A nodulizing agent is placed into an open reaction chamber formed in the top of a mold and molten graphite iron is fed to the reaction chamber by a new and improved sealing member which is movable to cover the chamber for the required casting time. The member is designed to permit the reacted alloy to flow through the member and across the top of the mold to the inlet of a casting cavity formed in the mold and covered by the member, thereby minimizing the depth of the reaction chamber and eliminating the need for forming runner systems in the mold, both of which contribute to the production of scrap material. Also provided is the temporary storage of the molten alloyed iron in an open reservoir to enhance homogenization of the alloy and to facilitate the removal of impurities therein.

7 Claims, 6 Drawing Figures

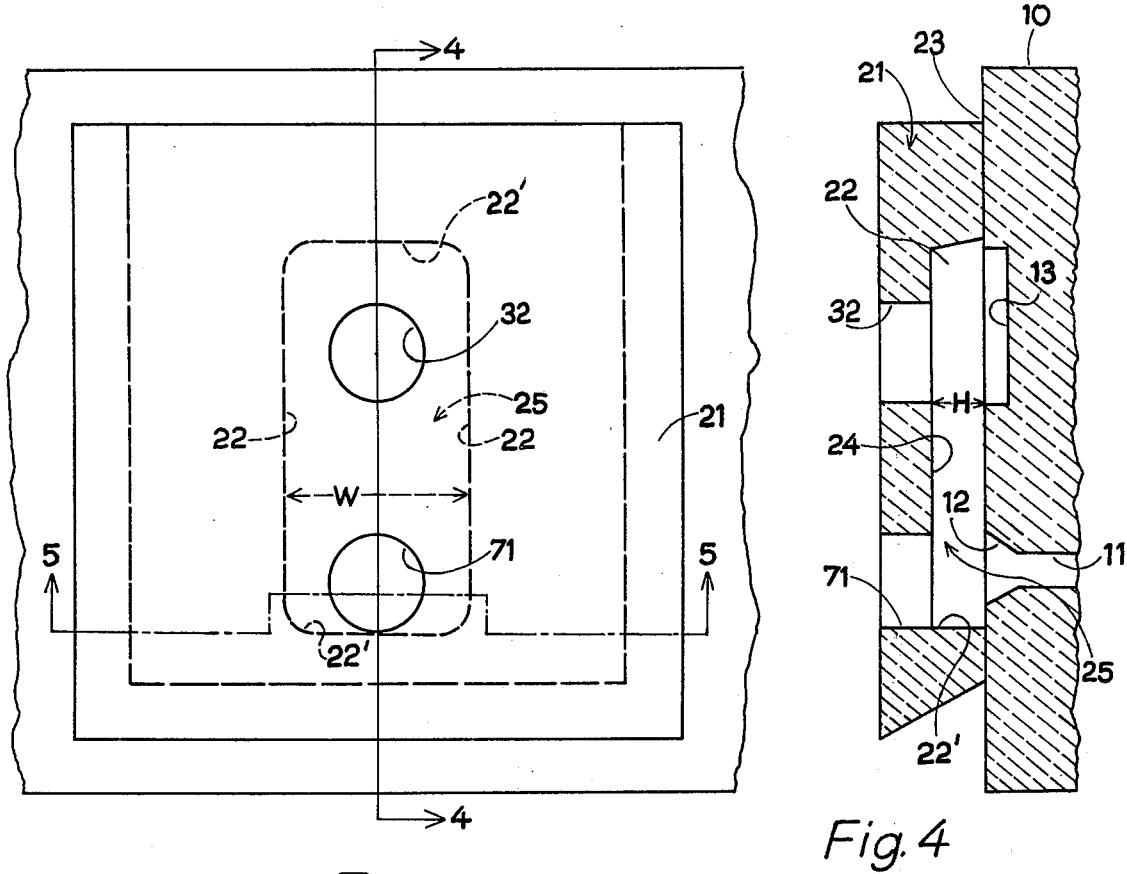
Fig. 3
Fig. 4
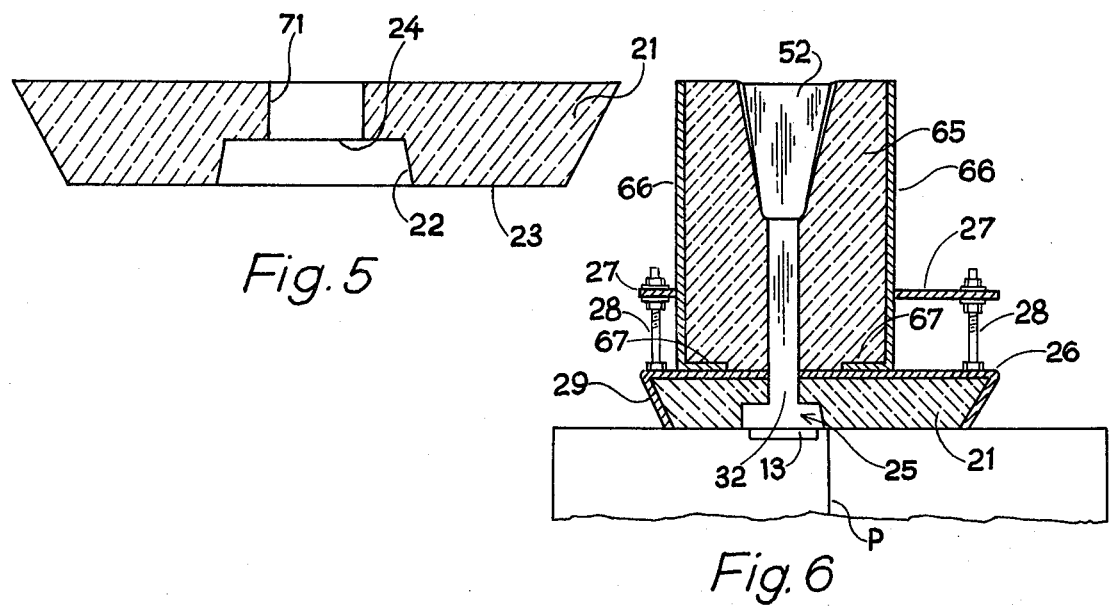
Fig. 5
Fig. 6

METHOD AND APPARATUS FOR MAKING DUCTILE IRON CASTINGS

INTRODUCTION

This invention relates to the production of metal castings and is described herein as applied to the production of ductile iron castings, where the invention finds special utility.

BACKGROUND OF THE INVENTION

Ductile iron is also referred to as nodular or spheroidal graphite cast iron and ductile iron castings are highly advantageous as compared to gray iron castings because of their ductility and because they have increased tensile strength and resistance to impact as compared to ordinary gray iron castings. Also, ductile iron has much better castability characteristics than steel and for an increasing number of uses, ductile iron castings can be used where steel castings or forgings were formerly required.

Ductile iron is produced by innoculating molten iron of the proper composition with a nodulizing agent that causes graphite which is ordinarily present in gray cast iron in flake-like form to assume a nodular or spheroidal form. It is this change in the characteristic of the graphite present in the cast iron that appears to give the ductile iron its advantageous characteristics. Whereas numerous nodulizers are known, magnesium is usually preferred because of its effectiveness, availability and relatively low cost.

Magnesium and the other nodulizing agents present problems because they have boiling points below the pouring temperature of cast iron and because they are easily oxidized. Because of these characteristics, attempts to add nodulizing agents in the conventional manners employed in adding alloying agents to molten iron present serious difficulties in that the addition of the agents to a ladle, for example, is likely to result in a violent pyrotechnic reaction that presents a hazard to foundry personnel and contamination of the foundry atmosphere. Also, some of the nodulizing agent is oxidized or otherwise lost, making it necessary to supply nodulizing agents in amounts in excess of the amounts required in order to compensate for "fading" or a reduction in the amount of nodulizing agent in solution.

In my Canadian Pat. No. 1,076,319, I disclose an apparatus and method particularly adapted for the automatic production of nodular iron castings. The patented apparatus is capable of rapid and economical production of high quality nodular iron castings and advantageously minimizes pyrotechnics developed during mold pouring.

The apparatus disclosed in my Canadian patent includes a mold having a casting cavity and a reaction chamber in which the nodulizing agent is deposited. The reaction chamber has an open top which is at the level of the adjacent upper or top surface of the mold and the floor of the chamber is at a level above the uppermost portion of the casting cavity. The chamber is connected at a level that is above the uppermost portion of the casting cavity. A cover or sealing member comprised of refractory material makes sealing engagement with the upper surface of the mold surrounding the open top of the chamber.

The sealing member is supported by a launder that is movable between a lower position with the sealing member in engagement with the flat, upper surface of the mold and a raised position in which the sealing member is disengaged from the upper surface of the mold; these movements of the sealing member are in directions substantially normal to the upper surface of the mold so that no appreciable sliding movement of the sealing member takes place with respect to the mold. The sealing member is raised from the mold after the predetermined amount of molten metal has been completely drained from the launder and the conduit into the mold and the mold is then free to be advanced past the sealing member for cooling and removal of the solidified casting.

As described in my Canadian Pat. No. 1,076,319, the apparatus is most advantageously used in combination with an automatic molding machine which may be any conventional type, such as the Disamatic molding machine produced by Dansk Industri Syndikat A/S. This machine produces individual molds successively and deposits them on the pouring rail of the machine. With this type of machine, each mold abuts a preceding mold and, in turn, is abutted by another following mold. A hydraulic ram associated with the molding machine pushes the whole series of molds along the pouring rail simultaneously. Thus, each mold is indexed a predetermined distance remaining stationary while another mold is deposited on the pouring rail, after which the entire series is again indexed. It is during the intervals when the molds are stationary that the nodulizing agent is introduced into the molds and the molds are poured.

As the molds travel along the pouring rail, they pass beneath an alloy-dispensing mechanism which may be of a known type and is arranged to deposit a predetermined amount of nodulizing agent in each mold. Each mold stops in registry with the alloy dispensing mechanism and while it is stopped, a predetermined amount of alloy is deposited into the nodulizing chamber of the mold. Thereafter, the mold is advanced beyond the alloy-dispensing mechanism and another mold is advanced into a position in registration with the alloy-dispensing mechanism where it, in turn, will receive a discrete amount of nodulizing material.

The molds continue to be advanced step-by-step down the pouring rail, passing a pressurized furnace which is arranged to deposit a predetermined amount of molten iron in a predetermined time into each mold as it stops on the pouring rail opposite the furnace. The batch quantity of molten metal is discharged from the furnace into a launder, and from the launder, the metal flows by gravity into the mold and to the casting cavities thereof as described in detail in my aforementioned Canadian patent. Each mold stops long enough opposite the furnace to permit the discharge of the required amount of iron into it and after this has taken place, the molds are all indexed another step and a following mold is disposed in pouring position opposite the furnace.

After the molds are poured, they continue on their step-by-step movement down the pouring rail where the castings are solidified, then into a cooling conveyor of known construction. Ultimately, the castings are removed from the molds, trimmed, inspected and tested. Conventional exhaust hoods may be placed over the conveyor as desired. Molten iron may be supplied to the furnace by conventional melting furnaces disposed on the other side of the furnace from the pouring rail.

The aforedescribed prior art apparatus and method works extremely well but there may be occasions when it is desired to entrap impurities before they flow into casting cavities by way of runners or downsprues. It may also be desired to allow a greater period of time for reacting the nodulizing agent with the molten metal to increase the homogeniety of the alloyed mixture.

Inasmuch as any molten metal remaining in the mold cavities forming the reaction chamber and the runners after the pour is completed becomes scrap, which must be trimmed from the casting, the volumes of the cavities formed in the mold by the reaction chamber and the runners should be minimized to maximize yield efficiencies. In addition, the shallower the depth of the open reaction chamber, the more readily visible is the nodulizing agent to a pourer responsible for ensuring the presence of the agent in the reaction chamber before making the pour.

OBJECT OF THE INVENTION

An object of this invention is to provide a new and improved apparatus and method by which the aforementioned desired results may be achieved through certain modifications to the sealing member and the mold described in my Canadian Pat. No. 1,076,319.

SUMMARY OF THE INVENTION

In accordance with one aspect of this invention, a reservoir is provided in the sealing member to contain and store the treated molten metal received from the reaction chamber. The reservoir retains the alloy long enough to permit increased interaction to occur between the metal and the nodulizer agent before the nodulized material is fed to an underlying mold cavity inlet. Uniformity of distribution of the agent in the metal is thereby enhanced. The reservoir may be open at its top to facilitate the removal of slag and other impurities therein. This feature eliminates the need for incorporating slag traps in the mold gating system which usually reduce the yield of the pour.

In accordance with another aspect of this invention, a chamber is formed in the bottom of the sealing member opposite the top of the reaction chamber and the cavity inlet when the member engages the mold. The chamber is open facing downwardly to increase the area which is available for metal to flow into and out of the reaction chamber. As a result, the depth of the reaction chamber in the mold can be minimized and greater pour efficiencies realized because there is less metal remaining in the reaction chamber as scrap after the casting hardens. It also permits an operative to more easily observe the presence or absence of nodulizing agent in the mold reaction chamber after the mold leaves the nodulizer dispenser. The chamber formed by the member encloses the mold surface between the chamber and the downspure and thus, serves as a runner between the reaction chamber and the downsprue to the casting cavities, thereby eliminating scrap attributable to poured metal hardening in a conventional mold runner system.

BRIEF DESCRIPTION OF THE DRAWINGS

FIG. 3 is a top plan view of the mold sealing member and a portion of the underlying mold, constructed in accordance with this invention;

FIG. 4 is a section through the member of FIG. 3, taken along section line 4—4 of FIG. 3, and a fragmentary sectional view of the underlying mold;

FIG. 5 is a section through the member of FIG. 3 taken along section line 5—5 of that Figure; and FIG. 6 is an end sectional view of the launder, the sealing member and the mold, taken along section line 6—6 of FIG. 2.

DETAILED DESCRIPTION

Figure 1:
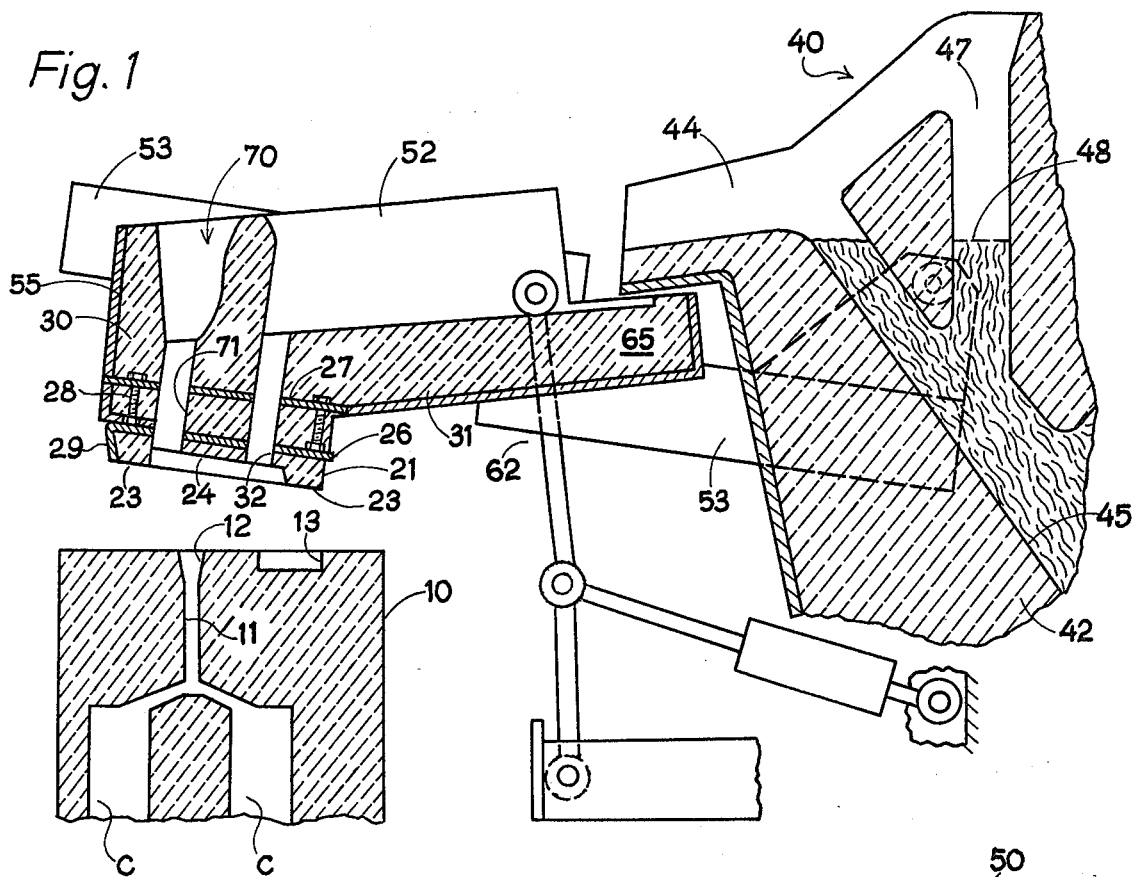
FIG. 1 is a sectional view showing a launder constructed in accordance with this invention in conjunction with fragmentary portions of the furnace and the mold, the launder being shown in its raised position.
Figure 2:
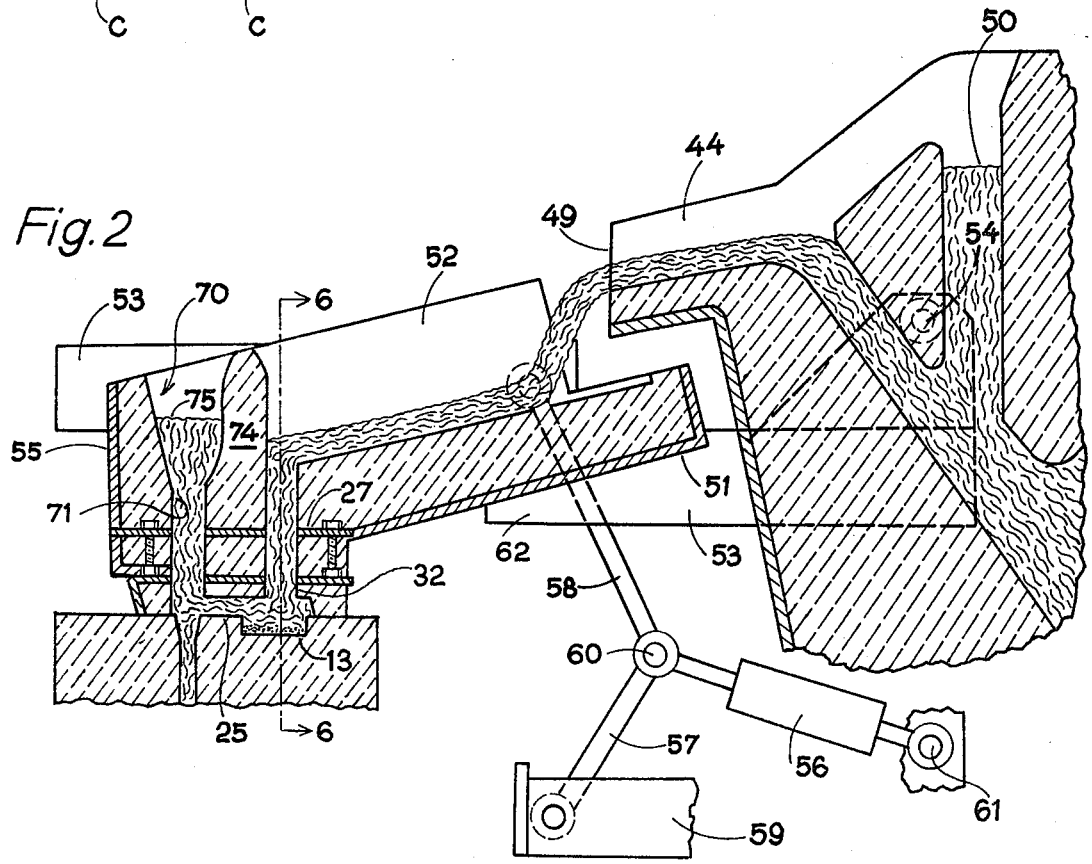
FIG. 2 is a fragmentary sectional view of the parts shown in FIG. 1 but illustrating the apparatus in its lowered position pouring liquid iron into the mold.

With reference to FIGS. 1, 2 and 6, a mold 10 having a vertical parting plane P embodies a plurality of casting cavities C that are connected by a downsprue 11 having an open inlet 12. The inlet 12 extends generally vertically from the upper mold surface and is spaced from a centrally disposed nodulizing chamber 13 in which a nodulizing agent is dispensed. It will be noted that the upper surface of the mold is employed to convey the molten iron from the chamber 13 to the inlet 12, thereby eliminating any intervening cavities for runners and the like which are used in conventional systems to convey the molten iron from the chamber 13 to the downsprue 11. Not only is the need for the runners eliminated; importantly, the scrap metal produced by the poured metal hardening in the runner system is eliminated thereby increasing pour efficiencies. The molten iron reacts with the nodulizing agent in the chamber 13 before flowing into the downsprue 11 and its associated ingates and casting cavities.

The nodulizing chamber 13 is disposed in the upper portion of the mold and is open at the top. The upper edges of the side walls defining the chamber 13 lie in the same plane as the surrounding upper surface of the inlet 12 and the mold 10.

With this construction of the mold, it is possible to seal the open top of the nodulizing chamber 13 and the downsprue 11 by the member 21 during the pouring operation. The fact that the chamber 13 is open makes it possible for an operative to check visually before pouring to determine that the nodulizing agent is present therein.

As may be observed, the depth of the chamber 13 is less than that of the chamber 31 of my aforementioned Canadian patent. This is because the new and improved sealing member 21 of the instant invention provides a composite chamber which supplements the mold chamber 13 for containing the metal and the agent.

This is made possible by forming the lower end of the member 21 with a centrally located wall 22 which extends upwardly from the surrounding lowermost surface 23 of the member 21. The wall 22 joins with the inward flat surface 24 to form a downwardly open chamber which faces opposite the mold chamber 13 and the inlet 12 when the surface 23 is moved to engage the upper surface of the mold 10 surrounding the inlet 12 and the mold chamber 13, as shown in FIGS. 2 and 4.

The sealing member 21 is composed of a suitable refractory composition, such as a fused silica. In order to support the sealing member 21, a shallow metal plate 26 is adjustably supported from flanges 27, respectively, affixed to the launder and apertured to receive screws 28, the heads of which are welded to the plate 26. The screws 28 are secured in the flanges 27 as by nuts. The plate 26 has inwardly bent edges 29 which bear against the complementarily inclined edges of the member 21, FIGS. 4 and 5, and thereby hold the member 21 tightly under the plate 21. Other means, such as disclosed in my aforementioned Canadian Patent can be used to affix the refractory seal to the free end of the launder. Molten iron flows into the upwardly extending chamber in the member 21 by means of a conduit 32.

Furnace 40, which produces the molten iron, is of a known type that is adapted to deliver accurately controlled quantities of liquid iron at accurately controlled temperatures within a predetermined period of time. A furnace of this type is described in my aforementioned Canadian Patent and comprises a suitable pressure vessel 42 which is mounted on a movable carriage (not shown) so that its position can be adjusted transversely of the pouring rail (not shown) in order to locate the furnace accurately with respect to the reaction chambers formed in the molds as the molds are successively moved along the rails. The furnace is provided with heating elements and appropriate controls to keep the molten iron within it at a temperature that is accurately controlled. The furnace is under a controlled super-atmospheric pressure of compressed air, the air pressure being controlled by means of a detecting device positioned at a fixed level beneath the molten iron within the furnace. The detecting device measures the static pressure in the molten metal at the level of the detecting device at all times. This pressure is maintained at desired values by automatic controls even though the level of molten iron in the furnace may vary within a normal operating range. Since the mode of operation and controls of various types of pressure pouring devices are well known, they are not described in detail herein.

As shown in FIGS. 1 and 2, the furnace has a pouring spout 44 that is connected to a conduit 45 that extends downwardly into the furnace vessel 42 to an open end disposed substantially below the normal level of molten metal within the vessel 42. Molten metal is supplied to the interior of the vessel 42 through an inlet, not shown; a typical level of molten metal in the vessel 42 being indicated by the dotted line in FIG. 1. The upper end of the conduit 45 terminates in the pouring spout 44, which is shown in the form of a trough. Slightly below the juncture of the conduit 45 and the pouring spout 44, there is a branch conduit 47 that is open at the top and functions to limit the ferrostatic head of the molten metal that can be developed in the conduit 45. This arrangement assists in maintaining the rate of flow of molten metal in the conduit 45 substantially constant.

In operation, the controls maintain the pressure of compressed air on the surface of the molten metal within the pressure vessel 42 at a value such that the level of the molten metal in the conduit 45 and branch conduit 47 is maintained at a "ready-to-pour" level, indicated by the line 48 in FIG. 1. During pouring, the pressure on the surface of the molten metal within the pressure vessel 42 is increased to raise the level of molten metal in passage 47 to a pouring level such as indicated at 50 in FIG. 2, thus discharging molten metal from the pouring spout into the launder, which is then in its lowered position. The flow of the molten metal is stopped quickly by reducing the pressure within the vessel 42, causing the level of metal in passage 47 to drop to the ready-to-pour level shown at 48 in FIG. 1.

The end or lip 49 of the pouring spout is disposed over the inner end 51 of the trough 52 of the launder 31, the launder being shown in its raised position in FIG. 1 and in pouring position in FIG. 2.

The launder 31 is supported from the furnace 40 by brackets 53 disposed on either side thereof by pivotal connections 54. The opposite ends of the brackets are secured to a transverse L-shaped frame member 55 of the launder and the launder may be moved between its raised position shown in FIG. 1 and its pouring position shown in FIG. 2, by any convenient mechanism such as a hydraulic piston and cylinder mechanism 56 acting through toggle links 57 and 58.

The link 57 is pivotally supported by a bracket 59 carried by the furnace 40 and is pivoted to link 58 at 60. Link 58 is pivotally connected to one of the brackets 53. The cylinder of assembly 56 is also pivotally supported by the furnace as at 61. The piston rod of assembly 56 is pivotally connected to the pivotal connection 60. In the extended position of the piston rod shown in FIG. 1, the launder is in the raised position shown therein. In the retracted position of the piston rod shown in FIG. 2, the launder is lowered so that the seal 21 firmly engages the top surface of the mold 10 and makes a seal surrounding the open nodulizing chamber 13 and the inlet 12.

As shown particularly in FIGS. 1 and 6, the trough of the launder is supported by an intermediate support 62 that extends between the pivoted support arms 53. If desired, mechanism can be provided to permit limited sideways adjustment of the launder along the pouring rail. The trough comprises a refractory member 65 supported by a built-up steel frame made of L-shaped side members 66 having bottom flanges 67 and the cross member 55 supporting the flanges 27 as described in my aforementioned Canadian Patent.

As will be seen from FIGS. 1 and 2, when the launder is in its lowered position, molten metal discharged from the pouring spout 44 of the furnace can flow down the trough 52 through the conduit 32 directly into the reaction chamber 13 of each mold as it is positioned on the pouring rail in alignment with the furnace.

The operation of this type of apparatus is known and will only be summarized herein. The stroke of the hydraulic ram that advances completed molds from the molding machine along the pouring rail is adjusted so that the molds are advanced a distance equal to the width of a mold after each mold is deposited on the pouring rail. The position and amount of discharge of the alloy dispensing apparatus (not shown) are adjusted so that the apparatus will discharge the correct amount of alloy into the chamber 13 of each mold when the mold comes to rest in registration with the dispensing apparatus. Similarly, the position of the pressure vessel 42 and the attached launder are adjusted with respect to the pouring rail so that as each mold stops adjacent the furnace, the discharge of conduit 32 in the sealing member 21 will be disposed immediately above the chamber 13.

When these adjustments have been properly made and the molding machine started in operation, the molds will be advanced successively to a position in which they are aligned with the alloy dispensing apparatus and then subsequently to a position where they are aligned with the launder. The alloy dispensing apparatus is adjusted and timed so that it will automatically discharge the correct amount of alloy into the nodulizing chamber 13 of each mold when it comes to rest.

After the alloy has been deposited, the molds are successively advanced step-by-step to the pouring station adjacent the launder. During the periods of time when the molds are being moved, the hydraulic cylinder 56 is actuated to lift the launder to the raised position shown in FIG. 1 and the controlling mechanism of the furnace maintains the level of molten metal in the furnace at the ready-to-pour level indicated at 48. When a mold is brought into position and stopped immediately beneath the launder, the cylinder 56 is controlled to permit the launder to move to the pouring position shown in FIG. 2 with the sealing member 21 in engagement with the top surface of the mold, thereby sealing the surface of the mold surrounding the open topped nodulizing chamber 13. Then the controls of the pressure pouring apparatus of furnace are actuated to increase the pressure on the metal within the chamber 42 to a predetermined amount which causes molten metal to rise to the pouring level 50 in branch conduit 47 and to flow out of the pouring spout 44 onto the inner end 51 of the trough 52 and down the trough 52 to the conduit 32 and into the nodulizing chamber 13 where it is subjected to the action of the nodulizing alloy previously disposed in the chamber.

When the level of molten metal in the nodulizing chamber reaches the level of the upper surface of the mold, the molten metal flows across this surface into the inlet 12 guided by the side edges of the member 21 engaging the mold surface, down the downsprue 11 and the lateral ingates connected thereto and finally, into the several casting cavities connected to the ingates.

The rate of flow of molten metal from the pressure vessel 42 is accurately controlled by accurate maintenance of the temperature of the metal, the pressure within the vessel and a timing means adjusted to stop the discharge of the molten metal by quickly reducing the pressure within the pressure vessel 42 so that the level of the metal in the conduits 45 and 47 is reduced to the ready-to-pour level 48. By this apparatus, the amount of metal that is discharged into each mold and the time required for the discharge (i.e., the rate of discharge) can be controlled accurately. After the pouring is completed, the launder is automatically raised by the cylinder mechanism 56 and another mold is moved into pouring position.

As contrasted to the system disclosed in my aforementioned Canadian Patent, the central portion of the lower surface 24 of the member 21 downstream of the conduit 32 is raised from the upper surface of the mold 10 between the chamber and the downsprue inlet a height H, FIG. 4, to provide an elongated channel 25, FIG. 3, having a width dimension W, defined by the pair of parallel, outwardly inclined sidewalls 22 formed in the member 21. The two opposite end walls 22 defining the channel 25 are located outwardly of the chamber 13 and the inlet 12, respectively. Hence, the four contiguous channel walls constrain material flow between the chamber and the downsprue areas of the inlet mold. The cross-section of the channel formed by the chamber 25 can be designed to a configuration and an area which establishes an optimum flow rate through the chamber for the particular alloyed material. To ensure a steady flowage, this area is made about twice that of the conduit 32.

Thus, the alloyed material contained in the channel 25 flows under static pressure across the top of the mold into the casting cavities C. As mentioned hereinabove, this arrangement allows the molten metal supplied to the downsprue 11 to flow through the channel 25 on the top or upper flat surface of the mold rather than through the mold and thereby eliminates scrap metal which would otherwise be produced by runner systems and the like which are internal to the mold.

To maximize the efficiency of yield, the mold chamber 13 can be eliminated entirely by simply not making the corresponding cavity in the mold. The nodulizing agent is then placed on the planar, uppermost surface of the mold for displacement under the conduit 32 and, after reacting with the molten metal, the molten alloy washes into the mold cavity by metal flow through the chamber 25. In such case, the nodulizing agent that is placed on the uppermost surface of the mold may be a block of coherent material, rather than a granular pile to more effectively regulate the entrainment rate of nodulizer into the molten material flowing through the chamber to the cavity inlet.

In accordance with another embodiment of the instant invention, the apparatus may be modified to extend the time for interaction to occur between the molten metal and the nodulizing agent. This is accomplished by providing a reservoir or open topped container 70 in the extremity of the sealing member 21, the sidewalls of the reservoir being shaped similarly to that of the area above the conduit 32 and being separated therefrom by an upright intermediate barrier 74 which is part of the launder and member 21. The reservoir receives an alloy of molten metal and nodulizing agent from a conduit 71 which opens into the egress end of the channel 25 above the inlet 12. The cross-sectional area of the conduit 71 is substantially equal to that of the conduit 32 allowing molten alloy to be forced from the chamber 25 upwardly into the conduit 71 by the greater static pressure head in the conduit 32. To allow a build-up to occur in the reservoir 70, the cross-sectional area of the downsprue 11 is made considerably less than that of the conduit 71. Whereas initially the downsprue receives most of the alloyed material directly from the channel, as the flow of molten alloy across the inlet 12 builds up, the excess alloy is forced to flow upwardly into the reservoir 70, rising to a level indicated by numeral 75, and then feeds back down into the inlet 12 as the build-up subsides.

By allowing the material to remain in the reservoir 70, additional interaction between particles of the nodulizing agent and the molten iron occurs which increases the homogeneity of the alloy which flows back down to the inlet 12. Additionally, the reservoir is provided with an open top for access to slag and other impurities which float to the surface of the alloy in the reservoir. These impurities may be removed manually by an operative positioned above the launder.

As will be evident, the reservoir may be readily provided in the sealing member and the launder without substantial modification of either structure. If it is desired to utilize the reservoir on a selective basis, the conduit 71 may be blocked off when it is not desired to use it by inserting a ceramic disc (not shown) or similar type of removable plug into the conduit 70 or by other means. The blocking device can be removed when it is desired to place the reservoir into operation, as will be apparent.

It will be understood by those skilled in the art that various changes and modifications can be made to the apparatus and methods disclosed herein without departing from the scope of the invention as defined in the appended claims.

I claim as my invention:

1. The combination of an open mold containing a nodulizing treatment chamber and a casting cavity inlet adjacent the treatment chamber and spaced therefrom by one portion of an upper mold surface, and a sealing member mounted for movement toward and away from the mold for respectively engaging and disengaging the upper surface of the mold;

said sealing member having a lower surface opposing the upper mold surface which extends to cover the underlying treatment chamber and the casting cavity inlet, said sealing member having a portion which is raised from the mold upper surface portion opposite the treatment chamber to form a first conduit for the flow of nodulized molten metal therefrom to said casting cavity inlet when the member engages the mold;

said sealing member having a second conduit extending upwardly from the raised portion of said sealing member for conveying molten metal to said treatment chamber; and reservoir means mounted on the sealing member communicating with said first conduit for containing the nodulized metal received from said first conduit.

2. The combination according to claim 1 wherein said reservoir means comprises a container with an open top for providing access to impurities in the nodulized metal contained by said reservoir means.

3. The combination according to claim 1 wherein the raised surface portion of said sealing member extends opposite the casting cavity inlet.

4. The combination according to claim 3 wherein the cross-sectional area of the first conduit in said member is greater than the cross-sectional area of said casting cavity inlet.

5. The combination according to claim 4 wherein the cross-sectional area of the second conduit in said member is greater than the cross-sectional area of said casting cavity inlet.

6. The combination according to claim 1 wherein said reservoir means comprises:

an enclosing sidewall and an adjoining bottom wall, the bottom wall including part of said lower surface of said member opposite said casting cavity inlet and having a third conduit extending upwardly therethrough.

7. The combination as claimed in claim 6 wherein said bottom wall is composed of a refractory material, and wherein said third conduit is located above and proximate said casting cavity inlet.

* * * * *